April 1, 1958 W. F. POORE 2,828,771
PULSATION DAMPENER DEVICE
Filed April 24, 1956 2 Sheets-Sheet 1

INVENTOR.
Wallace F Poore
BY
Adelbert A. Steinmiller
ATTORNEY

April 1, 1958 W. F. POORE 2,828,771
PULSATION DAMPENER DEVICE
Filed April 24, 1956 2 Sheets-Sheet 2

INVENTOR.
WALLACE F. POORE
BY
Adelbert A. Steinmiller
ATTORNEY

United States Patent Office 2,828,771
Patented Apr. 1, 1958

2,828,771

PULSATION DAMPENER DEVICE

Wallace F. Poore, East McKeesport, Pa., assignor to Westinghouse Air Brake Company, Wilmerding, Pa., a corporation of Pennsylvania Application April 24, 1956, Serial No. 580,361

7 Claims. (Cl. 138—30)

This invention relates to devices for dampening, absorbing, or suppressing undesired pressure pulsations or surges in fluid systems, and more particularly to devices of the type employing a mandrel or perforated pipe section and resilient means associated therewith for providing a volume which varies as a result of pressure variations, and which is adapted to be connected in circuit with conduits or pipe lines carrying fluid subject to such pulsations or surges.

As is well known in the art to which the invention relates, pulsations and surges which the apparatus of the instant invention is designed to dampen and suppress originate in fluid systems in a number of ways. Reciprocating pumps have an output which is usually characterized by low cycle or low frequency surges of high volume or intensity; centrifugal and rotary pumps may have in their fluid output low volume surges occurring at a high frequency. In addition to these periodic surges, shock waves may be generated in any fluid flow system where the fluid is subject to sudden deceleration, such for example as that caused by closing a valve against the moving column of fluid. The closing of such a valve may result in the generation of surges or shock waves of high intensity, which may result in damaged pipe lines and in undesirable noises frequently known as "water hammer."

It is old in the art to suppress and dampen these surges and shock waves by connecting in the fluid line a mandrel or section of pipe having therein a number of perforations or throttling orifices, this mandrel or perforated section of pipe being surrounded by a resilient sleeve of rubber or other suitable resilient material. Sudden increases of pressure in the fluid in the line cause the fluid to flow through the perforations or throttling orifices into the volume between the sleeve and the line or mandrel, expanding the sleeve and thereby taking up or absorbing the excess pressure. When the pressure in the line returns to normal, the sleeve contracts and the fluid between the sleeve and the line is discharged through the openings or perforations back into the line.

A number of prior art devices provide housing means for enclosing the resilient sleeve and forming a sealed chamber around the sleeve, into which chamber there is introduced or installed a resilient material such as compressed air or sponge rubber, the resilient material in the chamber exerting pressure on the outside of the sleeve and acting to insure the rapid contraction or collapse of the sleeve or return to its former position, and discharge of fluid back into the line, when the line pressure falls to normal or below after the surge has passed.

The apparatus of the instant invention is adapted to obtain the advantages of these prior art devices without the necessity of a housing enclosing the resilient sleeve for providing a sealed chamber for resilient material. The instant apparatus accomplishes this object by providing a coiled tension spring which is itself wound around the resilient sleeve in the form of a helix and which acts upon the sleeve as it expands or contracts in a manner similar to the action of compressed air on the outside of the sleeve in the aforementioned housing type dampener devices, that is, to assist the sleeve in opposing expansion, and to assist the sleeve in contracting and forcing fluid from the volume between the perforated pipe section and the sleeve back into the fluid line, after the surges of pressure have passed.

Accordingly, it is a primary object of the instant invention to provide new and improved fluid pressure pulsation dampening apparatus.

Another object is to provide new and improved fluid pressure pulsation dampening apparatus employing a coiled tension spring wound around the outside of a resilient sleeve to assist the resilient sleeve in opposing flow of line fluid against the tension of the sleeve.

Other objects and advantages will become apparent after a perusal of the following specification when studied in connection with the attached drawings, in which:

Fig. 2 is a longitudinal cross-sectional view of apparatus constructed according to a second and preferred embodiment of the invention;

Fig. 3 is a fragmentary longitudinal cross-sectional view of apparatus constructed according to a third embodiment of the invention; and Fig. 4 is a detailed view of the end spacer element of the apparatus of Fig. 3.

Figure 1:
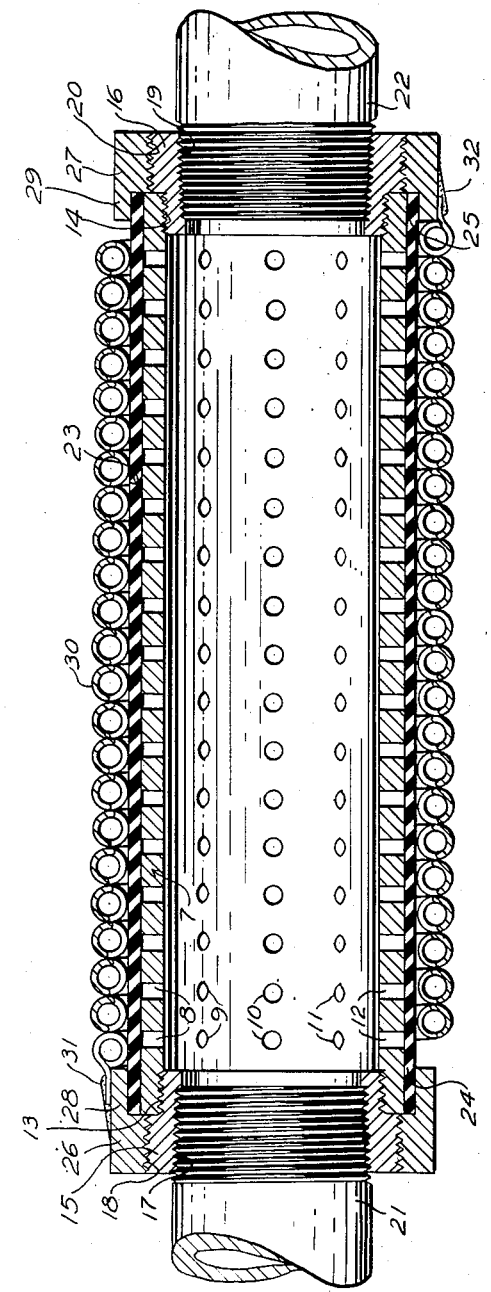
Fig. 1 is a longitudinal cross-sectional view of apparatus constructed according to a first embodiment of the invention.

Referring now to the drawings, in which like reference characters are used throughout to designate like parts, for a more detailed understanding of the invention, and in particular to Fig. 1 thereof, there is shown at 7 a pipe section having eight rows of throttling orifices in the wall thereof, the rows preferably extending lengthwise of the setcion, five of the rows of orifices being shown at 8, 9 10, 11, and 12. The aforementioned pipe section 7 has internal threads at the ends 13 and 14 thereof. In threaded engagement with the ends 13 and 14 are a pair of plug members 15 and 16 respectively, the plug member 15 having an internal threaded bore 17 and external threads 18, while the plug member 16 has internally threaded bore 19 and external threads 20. The pipes 21 and 22 of the line carrying the fluid from which pressure pulsations are to be removed are adapted to make threaded engagement with the aforementioned internally threaded portions 17 and 19 respectively. Whereas for convenience of illustration, only the embodiment of the invention has been shown in which the surge dampening apparatus is connected in the fluid circuit so that all of the fluid from which undesired pressure pulsations are to be removed flows through the apparatus, it is to be understood that one end of the apparatus shown could, if desired, be closed, as by a solid plug, and the other end of the apparatus connected to the fluid line, as by a T-joint.

A resilient sleeve 23 of rubber or other suitable material surrounds the perforated pipe section 7, the ends 24 and 25 of the sleeve 23 extending well beyond the perforated portion of the pipe section, to provide means for sealing the apparatus against the flow of line fluid around the ends of the resilient sleeve, in a manner to be hereinafter more clearly made apparent.

Mounted on the plug members 15 and 16 in threaded engagement with the external threads 18 and 20 thereof respectively are a pair of nut members 26 and 27 respectively which have inwardly extending annular lip portions 28 and 29 respectively adapted to firmly press against the ends 24 and 25 of the resilient sleeve 23 and provide a sealing arrangement for the sleeve. Disposed around the resilient sleeve 23 is a coiled tension spring 30, the turns of the spring 30 being themselves substantially circular in shape, the spring 30 being wrapped around sleeve 23 to form a cylindrical helix, the ends of the spring 30 being firmly secured to the nut members 26 and 27 respectively as by welding at 31 and 32 respectively.

In the operation of the above-described apparatus, pulses of pressure in the fluid in the pipes 21 and 22 and the pipe section 7 cause fluid to flow through the rows of throttling orifices including rows 8, 9, 10, 11, and 12, and to force the resilient sleeve 23 away from the outer surface of the pipe section 7, enlarging the volume between the sleeve 23 and the pipe section 7. As the sleeve moves away from the pipe section the spring 30 stretches, increasing over at least a portion of the length of the sleeve the radius of the helix which the spring forms about the outside of the resilient sleeve 23. The tension of spring 30 is increased, aiding the sleeve 23 in resisting further expansion and controlling the flow of fluid into the volume between it and the pipe section 7. After the surge of pressure has passed, the sleeve 23 and spring 30 together force the fluid back from the volume between the sleeve 23 and pipe section 7 through the orifices 8, 9, 10, 11, and 12 into the fluid line of pipes 21 and 22.

Particular reference should be made now to Fig. 2, in which the preferred embodiment of the invention is shown, and in which the turns of the helical spring are themselves substantially square in shape, this embodiment providing a removable housing for preventing dust and other undesirable material from getting into the dampener device and shortening the useful life thereof.

In Fig. 2 there is shown the aforementioned pipe section 7 having eight rows of throttling orifices in the wall thereof, the rows preferably extending lengthwise of the section, five of the rows of orifices being shown at 8, 9, 10, 11, and 12. The aforementioned pipe section 7 has, as before mentioned, internal threads at the ends 13 and 14 thereof. The aforementioned plug members 15 and 16 are respectively in threaded engagement with the aforementioned ends 13 and 14, the plug member 15 having, as in Fig. 1, an internal threaded bore 17 and external threads 18, while the plug member 16 has, as in Fig. 1, internally threaded bore 19 and external threads 20. The pipes 21 and 22 of the line carrying the fluid from which pressure pulsations are to be removed are adapted to make threaded engagement with the aforementioned internally threaded portions 17 and 19 respectively. Whereas for convenience of illustration the preferred embodiment of the invention has been shown in which the surge dampening apparatus is connected in the fluid circuit so that all of the fluid from which undesired pressure pulsations are to be removed flows through the apparatus, it is to be understood that one end of the apparatus shown in Fig. 2 could, if desired, be closed, as by solid plug, and the other end of the apparatus connected to the fluid line, as by a T-joint.

A resilient sleeve generally designated 23 and similar to the sleeve 23 of the apparatus of Fig. 1 surrounds the perforated pipe section 7, the ends 24 and 25 of the sleeve 23 extending well beyond the perforated portion of the pipe section, to provide means for sealing the apparatus against the flow of line fluid around the ends of the resilient sleeve, in a manner similar to the apparatus of Fig. 1.

Mounted on the plug members 15 and 16 in threaded engagement with the external threads 18 and 20 thereof respectively are a pair of nut members 33 and 34 respectively, nut member 33 having a number of peripherally-spaced threaded bores 35 therein, and the nut member 34 having a plurality of peripherally-spaced threaded bores 36 therein, for purposes to be hereinafter apparent. The nut members 33 and 34 have inwardly extending annular lip portions 37 and 38 respectively, adapted to firmly press against the ends 24 and 25 of the aforementioned resilient sleeve 23 and provide a sealing arrangement for the sleeve. Disposed around the resilient sleeve 23 is a helical tension spring 39, the turns of the helical spring 39 being themselves substantially square in shape, the spring 39 being wrapped around the sleeve 23 to form a cylindrical helix, the ends of the spring 39 being firmly secured to the nut members 33 and 34 respectively as by welding at 31 and 32 respectively in a manner similar to the welding of Fig. 1.

Disposed around the outside of the resilient tension spring 39 and the cup members 33 and 34 is a housing which comprises two substantially cylindrical portions 40 and 41 which are of slightly different diameter and which are adapted to telescope at the inside ends thereof to provide a substantially dust-proof seal against the entrance of dust and other foreign matter. The outer ends of the cylindrical housing sections 40 and 41 have inwardly extending flange portions 42 and 43 respectively, each of which has a plurality of peripherally-spaced bores therein, the bores in end portion 42 being designated by the reference numeral 44, while the bores in the end portion 43 are designated 45. In the bores 44 are disposed a plurality of bolts 46 which extend into the aforementioned threaded bores 35 in the cup member 33 and make threaded engagement therewith for securely holding the member 40 to the cup member 33. Mounted in the bores 45 in flange portion 43 are a plurality of bolts 47 which extend into the aformentioned threaded bores 36 in cup member 34 making threaded engagement therewith and securely holding the cylindrical housing portion 41 to the cup member 34. When it is desired to disassemble the apparatus, the bolts 46 and 47 are removed and the cylindrical housing portions 40 and 41 are slid off the ends of the dampener device, it being understood that the pipes 21 and 22 have theretofore been disconnected.

The end turns of the helical spring 39 are spaced from the lip portions 37 and 38 by spacing members 48 and 49 respectively, the spacing members 48 and 49 being provided to prevent the turns of the cylindrical helix near the ends of the sleeve from slipping during the expansion of the resilient sleeve and forming gaps between the turns of the helix, which would result in no restraining force being applied to the outside of the resilient sleeve 23 over the area of the gaps, thereby endangering the life of the sleeve.

The operation of the apparatus of Fig. 2 is similar to the operation of the apparatus of Fig. 1 and need not be described in detail. The housing composed of cylindrical portions 40 and 41 offers the advantage of preventing dust and moisture from reaching the spring 39 and resilient sleeve 23, but is normally spaced from the outside of spring 39 a sufficient distance so that it does not interfere with the expansion of resilient sleeve 23 and helical spring 39.

Particular reference should be now to Fig. 3, in which a portion of a longitudinal section of a third embodiment of the invention is shown. Fig. 3 is similar to the apparatus of Fig. 2 except that a helical coiled spring 50 is employed, the turns of the helical spring 50 being substantially rectangular in shape, a long side of the rectangle preferably abutting against the outer surface of the sleeve, thereby providing for the application of the restraining force of the spring to an increased area of the resilient sleeve 23 and reducing the number of small gaps therein from the number occurring in the apparatus of Figs. 1 and 2, these gaps in the area of the resilient sleeve to which the restraining force of the spring is applied resulting from the coil nature of the spring itself and the round turns or rounded corners of the square turns thereof, which rounded shapes are desirable to prevent any abrasive force or sharp surface from being applied to the outside of the resilient sleeve 23.

The remainder of the parts of the apparatus of Fig. 3 may be substantially identical with the corresponding parts of the apparatus of Fig. 2, except that the spacer member 51 is of suitable dimensions to properly space the end turn of the spring 50 from the lip portion 38, it being understood that a similar but inverted spacer member, not shown, is provided for the other end, not shown, of the dampener apparatus of Fig. 3.

Particular reference should be made now to Fig. 4, in which there is shown a detailed view of the spacer member 51. It should be noted that the spacer member 51 is in the form of a split ring, and has a width which gradually and uniformly increases from zero to substantially the width of one long side of the rectangular spring 50.

In the embodiment of Fig. 2, the sides of each turn of the substantially square spring 39 may be any length that is deemed desirable, and in the embodiment of Fig. 3 the length of that side of the rectangular spring 50 which is adjacent the resilient sleeve may be any length that is desired.

Whereas the invention has been shown and described in connection with embodiment thereof in which the perforated pipe section has eight rows of throttling orifices therein, it is to be understood that any convenient number could be employed.

The ratio between the area of the pipe section 7 and the total of the areas of all the throttling orifices may be that which is deemed most desirable, and the invention is not limited to any particular ratio. Moreover any size or shape of throttling orifices may be employed as desired.

Having now described the invention, what I claim as new and desire to secure by Letters Patent, is:

1. Pulsation dampening apparatus for use with a conduit carrying a fluid under variable pressure, comprising, in combination, a pipe section for connecting to said conduit, said pipe section having a perforated portion with a plurality of throttling orifices in the wall thereof, said orifices being arranged in a plurality of rows extending along the length of the perforated portion, resilient sleeve means substantially surrounding said pipe section, the ends of said resilient sleeve means extending beyond the perforated portion of the pipe section, a pair of nut members operatively connected to the ends of the pipe section respectively, said nut members having inwardly extending annular lip portions, said lip portions securing the ends of said resilient sleeve means in sealed relationship with the ends of the pipe section respectively, a helical spring coiled around the outside of said sleeve means, and means for securing the ends of said helical spring to said nut members respectively.

2. Pulsation dampening apparatus for use with a conduit carrying a fluid under variable pressure, comprising, in combination, a pipe section for connecting to said conduit, said pipe section having a plurality of throttling orifices in the wall thereof, resilient sleeve means substantially surrounding said pipe section and covering said orifices, means for securing the axial ends of said sleeve means in sealed relation with said pipe section, spring means disposed around the outside of said sleeve means and applying pressure to the outer surface of said sleeve means, said spring means including a helical spring coiled around the outside of said sleeve means, means for anchoring said spring means at its respective ends, and housing means surrounding the outside of said spring means and normally spaced therefrom.

3. Apparatus according to claim 2, wherein the housing means includes a pair of substantially cylindrical portions of slightly different diameter with respect to each other, said cylindrical portions having the inner ends thereof in telescoping engagement with each other, and means for securing said cylindrical portion to the remainder of said apparatus.

4. Pulsation dampening apparatus for use with a conduit carrying a fluid under variable pressure, comprising, in combination, a pipe section for connecting to said conduit, said pipe section having a plurality of throttling orifices in the wall thereof, resilient sleeve means substantially surrounding said pipe section and covering said orifices, means for securing the axial ends of said sleeve means in sealed relation with said pipe section, spring means disposed around the outside of said sleeve means for applying pressure to the outer surface of said sleeve means, said spring means including a helical spring coiled around the outside of the said sleeve means, the turns of said helical spring being substantially square in shape, and means for anchoring said spring means at its respective ends.

5. Pulsation dampening apparatus for use with a conduit carrying a fluid under variable pressure, comprising, in combination, a pipe section for connecting to said conduit, said pipe section having a plurality of throttling orifices in the wall thereof, resilient sleeve means substantially surrounding said pipe section, and spring means disposed around the outside of said sleeve means and applying pressure to the outer surface of said sleeve means, said spring means including a helical spring coiled around the outside of said sleeve means, the turns of said helical spring being substantially rectangular in shape with long sides of the rectangles engaging the sleeve means for appreciable portions of the length of the sleeve means.

6. A pulsation dampening apparatus for use with a conduit carrying a fluid under variable pressure, comprising, in combination, a pipe section connectable to the conduit, said pipe section having a plurality of throttling orifices in the wall thereof, resilient sleeve means substantially surrounding said pipe section and covering said orifices, means for securing the axial ends of said sleeve means in sealed relation with said pipe section, a helical spring wound around the outside of said sleeve means to form a cylindrical helix, and means for anchoring said spring at its respective ends.

7. Apparatus according to claim 6, wherein said anchoring means comprises a pair of spacer elements which bear on the respective ends of said helical spring for preventing the end turns of said helical spring from substantially changing their longitudinal position on the outer surfaces of the sleeve means as the sleeve means expands under the influence of the pulse or surge of fluid pressure in the conduit.

References Cited in the file of this patent

UNITED STATES PATENTS

| | | |
|---|---|---|
| 1,852,897 | Price | Apr. 5, 1932 |
| 1,932,666 | Hyatt | Oct. 31, 1933 |
| 2,261,948 | Beach | Nov. 11, 1941 |
| 2,278,688 | Caminez | Apr. 7, 1942 |
| 2,495,693 | Byrd et al. | Jan. 1, 1950 |